US008953846B2

(12) United States Patent
Wu et al.

(10) Patent No.: US 8,953,846 B2
(45) Date of Patent: Feb. 10, 2015

(54) LICENSE PLATE RECOGNITION SYSTEM AND METHOD

(71) Applicant: National Chiao Tung University, Hsinchu (TW)

(72) Inventors: Bing-Fei Wu, Hsinchu (TW); Yen-Lin Chen, Kaohsiung (TW); Hao-Yu Huang, Kaohsiung (TW); Hsin-Yu Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 128 days.

(21) Appl. No.: 13/898,897

(22) Filed: May 21, 2013

(65) Prior Publication Data

US 2014/0177925 A1    Jun. 26, 2014

(30) Foreign Application Priority Data

Dec. 25, 2012   (TW) .............................. 101149760 A

(51) Int. Cl.
*G06K 9/00* (2006.01)
*G08G 1/017* (2006.01)
(52) U.S. Cl.
CPC .............. *G08G 1/0175* (2013.01); *G06K 9/00* (2013.01)
USPC ........................................................ 382/105
(58) Field of Classification Search
None
See application file for complete search history.

(56) References Cited

U.S. PATENT DOCUMENTS

| 6,473,522 | B1* | 10/2002 | Lienhart et al. | 382/168 |
| 8,630,497 | B2* | 1/2014 | Badawy et al. | 382/225 |
| 2002/0080013 | A1* | 6/2002 | Anderson et al. | 340/425.5 |
| 2009/0208059 | A1* | 8/2009 | Geva et al. | 382/105 |
| 2012/0106802 | A1* | 5/2012 | Hsieh et al. | 382/105 |

OTHER PUBLICATIONS

Lee et al ("Automatic recognition of car license plate using color image processing", pp. 301-305, IEEE 1994.*
Kim et al ("Learning-based approach for license plate recognition", p. 614-623, IEEE 2000).*

* cited by examiner

*Primary Examiner* — Amara Abdi
(74) *Attorney, Agent, or Firm* — Tim Tingkang Xia, Esq.; Morris, Manning & Martin LLP

(57) ABSTRACT

A license plate recognition system and method recognizes a license plate attached to a vehicle and bears a license plate number. The system includes a database module, a reducing module, an image capturing unit, a sorting unit, and a recognizing module. The database module stores license plate position sample type-related data and license plate number sample type-related data whose quantity is reducible by the reducing module. The image capturing unit captures license plate images at different imaging resolutions to generate license plate position image eigenvalue and license plate number image eigenvalue. The sorting unit computes the license plate position image eigenvalue to generate license plate position type-related data and computes the license plate number image eigenvalue to generate license plate number type-related data. The recognizing module compares the license plate number type-related data with the license plate number sample type-related data, thereby recognizing the license plate number.

12 Claims, 14 Drawing Sheets

LICENSE PLATE RECOGNITION SYSTEM AND METHOD

CROSS-REFERENCE TO RELATED APPLICATION

This non-provisional application claims priority under 35 U.S.C. §119(a) on Patent Application No(s). 101149760 filed in Taiwan, R.O.C. on Dec. 25, 2012, the entire contents of which are hereby incorporated by reference.

FIELD OF THE INVENTION

The present invention relates to license plate recognition systems and methods, and more particularly, to a system and method for recognizing the license plate number of a vehicle.

BACKGROUND OF THE INVENTION

According to the prior art, people handle daily affairs efficiently, thanks to modern image processing technology. For example, bus terminals along highways are usually installed with an image processing and recognition system based on conventional image processing technology and adapted to monitor the arrival and departure of a plurality of buses. A conventional method for monitoring the traffic attributed to the buses entails recognizing license plate numbers of the buses using the conventional image processing technology.

At present, at plenty of highway bus terminals, license plate numbers are detected and recognized with the conventional image processing recognition system.

However, in the course of recognizing the license plate numbers, recognition failures are not uncommon.

Hence, the conventional image processing and recognition system applies character recognition technology, such as optical character recognition (OCR), in recognizing the license plate numbers of the license plates. However, during the process of recognizing the license plate numbers in accordance with the character recognition technology, the images of the license plate numbers have to be sharp in order for the license plate numbers to be recognized.

Furthermore, in the course of the license plate number recognition, recognition of the license plate numbers fails or is unsatisfactory for intrinsic reasons and extrinsic reasons. The intrinsic reasons include concealment of the license plate, dirt and dust on the license plate, and the situation where the license plate number printed on the license plate is blurred. The extrinsic reasons include inadequate illumination, glare arising from smog reflection, and blinding headlight.

Still, the aforesaid problems which occur for the intrinsic reasons and extrinsic reasons have remained unsolved.

In attempt to solve the aforesaid problems, the prior art puts forth some solutions, including performing license plate recognition in two step. The first step involves capturing an image of the license plate. The second step involves recognizing the license plate number. The license plate image capturing step requires computing license plate images with a license plate outline algorithm, a color distribution algorithm, or a grayscale distribution algorithm in order to evaluate regional distribution of the license plates. The license plate number recognition step involves recognizing the license plate number with a character recognition algorithm.

However, regardless of the algorithm used, the aforesaid prior art has to meet a criterion—to recognize a license plate number, the image of the license plate which bears the license plate number has to be sharp and recognizable.

Accordingly, it is imperative to provide a license plate recognition system and method in order to overcome the aforesaid drawbacks of the prior art.

SUMMARY OF THE INVENTION

It is an objective of the present invention to provide a license plate recognition system for recognizing a license plate attached to a vehicle, so as to monitor the traffic flow of vehicles.

Another objective of the present invention is to provide a license plate recognition system whereby a license plate image is computed by means of a histogram of oriented gradients (HOG) algorithm, principal component analysis (PCA), and support vector machine (SVM), thereby rendering the license plate image insusceptible to intrinsic factors and extrinsic factors in the course of license plate image recognition.

Yet another objective of the present invention is to provide a license plate recognition method whereby license plate images are computed and sorted by means of a HOG algorithm, PCA, and SVM, so as to determine the license plate position and the license plate number quickly and instantly.

A further objective of the present invention is to provide the license plate recognition method effective in reducing the quantity of the license plate sample type-related data (such as license plate position sample type-related data and license plate number sample type-related data) stored in a database module, reducing the space required for storing the sample type-related data in the database module, and speeding up the license plate recognition process.

A further objective of the present invention is to provide the license plate recognition method which involves determining the position of a license plate attached to a vehicle at the first imaging resolution (which is defined, according to the present invention, as a relatively low imaging resolution) and then capturing the license plate images at the second imaging resolution (which is defined, according to the present invention, as a relatively high imaging resolution) with a view to determining the license plate number of the license plate accurately.

A further objective of the present invention is to provide the license plate recognition method characterized in that: if it is determined that no license plate image sample type-related data pertaining to a new license plate is stored in the database module, a plurality of new license plate image frames pertaining to the new license plate will be capture, and then new license plate position sample type-related data and new license plate number sample type-related data will be created with an algorithm and stored in the database module, thereby enhancing the accuracy in license plate recognition.

In order to achieve the above and other objectives, the present invention provides a license plate recognition system for use in recognizing a license plate attached to a vehicle. The license plate bears a license plate number. The license plate recognition system comprises a database module, a reducing module, an image capturing unit, a sorting unit, and a recognizing module.

The database module comprises a license plate position database and a license plate number database. The license plate position database stores a plurality of license plate position sample type-related data, and the license plate number database stores a plurality of license plate number sample type-related data.

The reducing module is connected to the database module and adapted to reduce the quantity of the license plate position sample type-related data and license plate number sample type-related data stored in the database module.

The image capturing unit captures images of the license plate at the first imaging resolution and the second imaging resolution by following the steps described below. The image capturing unit captures the license plate images at the first imaging resolution. The image capturing unit uses a HOG algorithm to compute the license plate images and then generate a license plate position image eigenvalue. The image capturing unit captures the license plate images at the second imaging resolution, and uses the HOG algorithm to compute the license plate images and then generate a license plate number image eigenvalue. The second imaging resolution is of a level higher than that of the first imaging resolution.

The sorting unit is connected to the image capturing unit. The sorting unit uses PCA and SVM to compute the license plate position image eigenvalue and then generate license plate position type-related data. The sorting unit uses PCA and SVM to compute the license plate number image eigenvalue and then generate license plate number type-related data.

The recognizing module is connected to the sorting unit and the database module. The recognizing module compares the license plate position type-related data with the license plate position sample type-related data. After determining that the license plate position type-related data is identical with one of the license plate position sample type-related data, the recognizing module further compares the license plate number type-related data with the license plate number sample type-related data. After determining that the license plate number type-related data is identical with the license plate number sample type-related data, the recognizing module recognizes the license plate number of the license plate by means of the license plate number sample type-related data identical with the license plate number type-related data.

In order to achieve the above and other objectives, the present invention provides a license plate recognition method for recognizing a license plate attached to a vehicle, the license plate bearing a license plate number, the license plate recognition method comprising the steps of: step (a) storing in a license plate position database a plurality of license plate position sample type-related data pertaining to the license plate, and storing in a license plate number database a plurality of license plate number sample type-related data pertaining to the license plate number; step (b), capturing an image of the license plate at a first imaging resolution to thereby generate a first license plate image, and capturing an image of the license plate at a second imaging resolution to thereby generate a second license plate image; step (c), computing the first license plate image with a HOG algorithm to thereby generate a license plate position image eigenvalue, and computing the second license plate image with the HOG algorithm to thereby generate a license plate number image eigenvalue; step (d), computing the license plate position image eigenvalue and the license plate number image eigenvalue with PCA and SVM to thereby create license plate position type-related data and license plate number type-related data; and step (e), comparing the license plate position type-related data with the license plate position sample type-related data and, upon determination that the license plate position type-related data is identical with one of the license plate position sample type-related data, further comparing the license plate number type-related data with the license plate number sample type-related data and, upon determination that the license plate number type-related data is identical with one of the license plate number sample type-related data, recognizing the license plate number of the license plate by means of the license plate number sample type-related data identical with the license plate number type-related data.

Compared with the prior art, the present invention provides a license plate recognition system that overcomes related drawbacks of the prior art, for example, failure to recognize license plates accurately for factors inherent in the license plates and environmental factors.

The present invention entails performing a license plate recognition process in two stages. The first stage involves capturing the license plate images at a low imaging resolution to determine quickly the whereabouts of a license plate attached to a vehicle and, upon determination of the position of the license plate, capturing the license plate image at a high imaging resolution to thereby recognize the license plate number of the license plate.

Hence, the present invention is characterized in that license plate images are captured at two different imaging resolutions and in two stages to thereby save the time which is otherwise required for direct recognition of license plate numbers.

The present invention requires using two image-related algorithms (namely HOG and SVM) jointly. As a result, the algorithm-based image computation process brings about an enormous amount of data which occupy much storage space of the database module.

Furthermore, a comparison process performed on the aforesaid enormous amount of data during the image recognition process adds to the time required for the license plate recognition process.

To compensate for the aforesaid weakness, the present invention features the reducing module effective in reducing the data stored in the database module.

During the license plate recognition process, as soon as a new license plate (whose image type-related data are absent from the database module) is discovered, an updating module creates new license plate position sample type-related data and new license plate number sample type-related data pertaining to the new license plate and then stores the data thus created in the database module.

Furthermore, since the updating module captures images of a plurality of new license plate image frames in a specific period of time, it is feasible that the sharpest ones of the images of the new license plate image frames are selected for use in creating the new license plate position sample type-related data and the new license plate number sample type-related data, thereby increasing the probability of successful recognition of new license plates.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
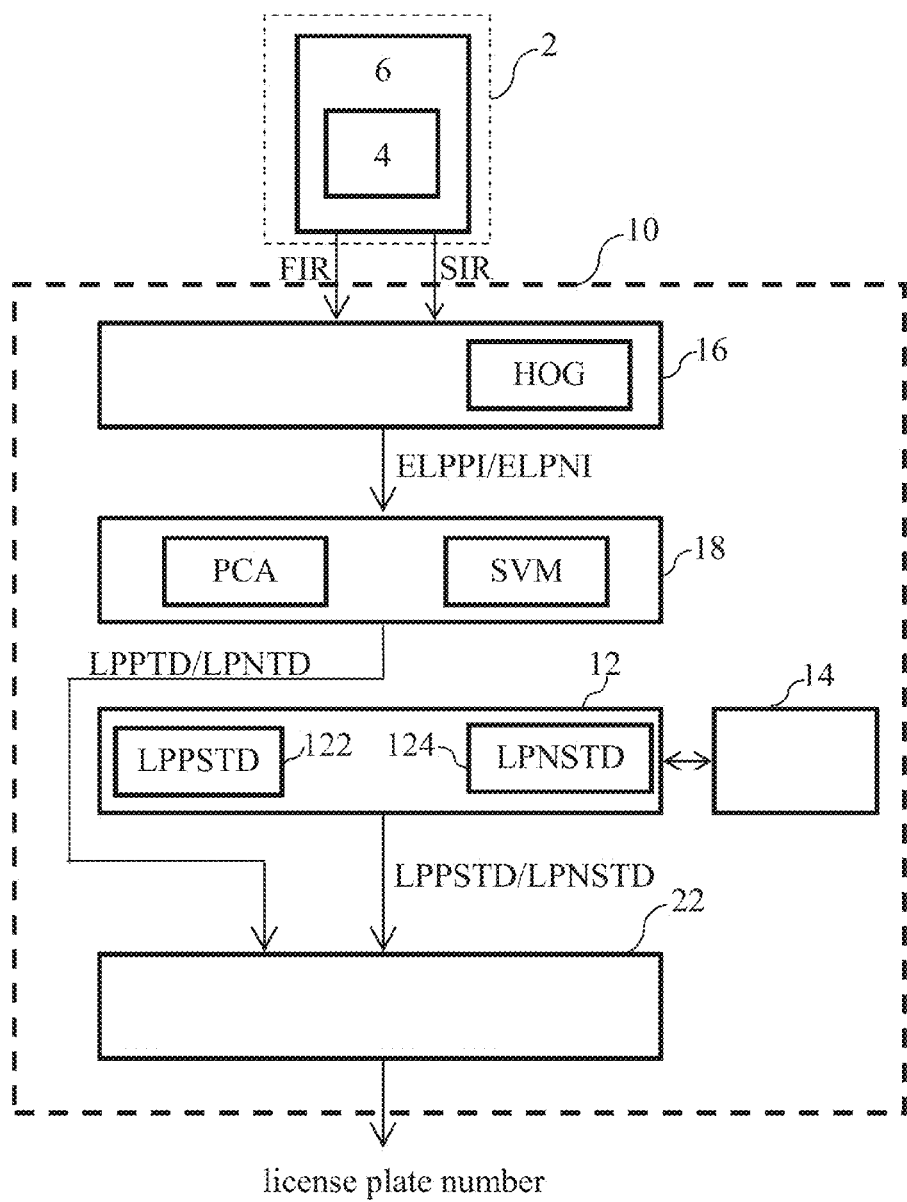
FIG. 1 is a block diagram of a license plate recognition system according to the first embodiment of the present invention.

Referring to FIG. 1, there is shown a schematic block diagram of a license plate recognition system 10 according to the first embodiment of the present invention. As shown in FIG. 1, the license plate recognition system 10 recognizes a license plate 4 attached to a vehicle 2. The license plate 4 bears a license plate number 6. In general, the size and shape of the license plate 4 are invariable within the territory of a country or region.

The license plate recognition system 10 comprises a database module 12, a reducing module 14, an image capturing unit 16, a sorting unit 18, and a recognizing module 22.

The database module 12 comprises a license plate position database 122 and a license plate number database 124. The license plate position database 122 stores a plurality of license plate position sample type-related data LPPSTD. The license plate number database 124 stores a plurality of license plate number sample type-related data LPNSTD.

The reducing module 14 and the database module 12 are connected. The reducing module 14 reduces the quantity of the license plate position sample type-related data LPPSTD and the quantity of the license plate number sample type-related data LPNSTD stored in the database module 12.

The image capturing unit 16 captures a license plate image at a first imaging resolution FIR and captures a license plate image at a second imaging resolution SIR.

In this embodiment, the image capturing unit 16 captures the images of the license plate 4 at the first imaging resolution FIR. Then, the image capturing unit 16 uses a histogram of oriented gradients (HOG) algorithm to compute the captured images of the license plate 4 to thereby generate an eigenvalue of license plate position image ELPPI.

The image capturing unit 16 captures the images of the license plate 4 at the second imaging resolution SIR. The image capturing unit 16 uses the HOG algorithm to compute the captured images of the license plate 4 to thereby generate an eigenvalue of license plate number image ELPNI.

In this embodiment, the second imaging resolution SIR is of a level higher than that of the first imaging resolution FIR. In this regard, imaging resolution is defined as the number of pixels of an image that can be recognized; that is to say, a recognizable image is displayed with more pixels at a high resolution than it is at a low resolution.

The sorting unit 18 and the image capturing unit 16 are connected. The sorting unit 18 uses principal component analysis (PCA) and support vector machine (SVM) to compute an eigenvalue of the license plate position image ELPPI to thereby generate license plate position type-related data LPPTD. The sorting unit 18 uses the PCA and the SVM to compute an eigenvalue of the license plate number image ELPNI to thereby generate license plate number type-related data LPNTD.

The PCA requires an algorithm for use in reducing vector sizes and compression and is not described in detail herein for the sake of brevity. The HOG algorithm and the support vector machine are described in detail hereunder.

The recognizing module 22 is connected to the sorting unit 18 and the database module 12. The recognizing module 22 compares the license plate position type-related data LPPTD with the license plate position sample type-related data LPPSTD.

After the recognizing module 22 has determined that the license plate position type-related data LPPTD is identical with one of the license plate position sample type-related data LPPSTD, the recognizing module 22 compares the license plate number type-related data LPNTD with the license plate number sample type-related data LPNSTD. After determining that the license plate number type-related data LPNTD is identical with one of the license plate number sample type-related data LPNSTD, the recognizing module 22 recognizes the license plate number 6 of the license plate 4 by means of the license plate number sample type-related data LPNSTD identical with the license plate number type-related data LPNTD.

Figure 2:
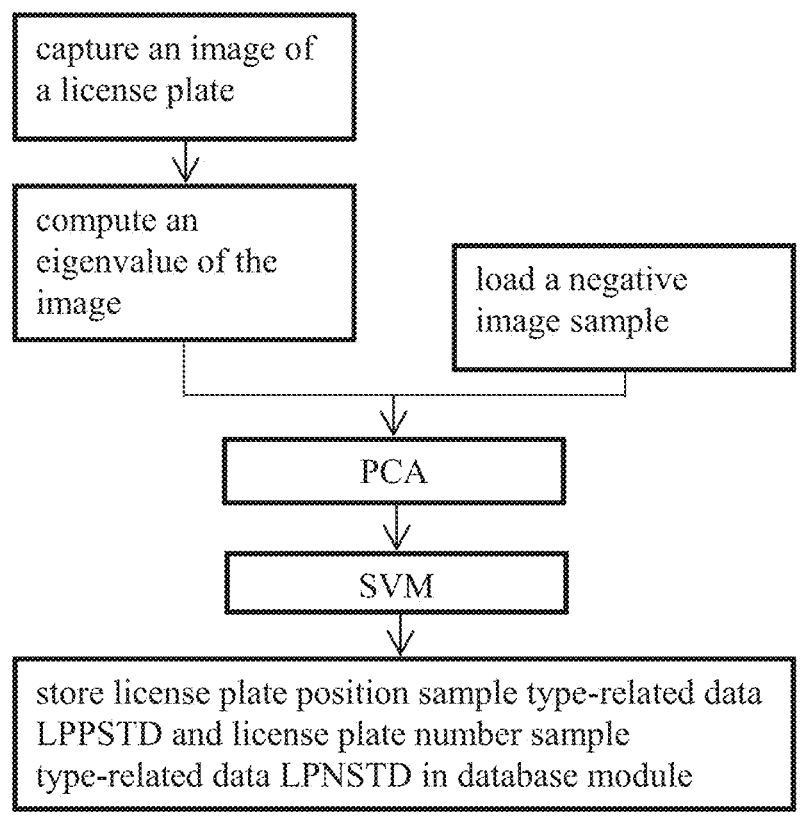
FIG. 2 is a flow chart of the process flow of creating license plate position sample type-related data and license plate number sample type-related data.

Referring to FIG. 2, there is a flow chart of the process flow of creating license plate position sample type-related data and license plate number sample type-related data. As shown in FIG. 2, the image capturing unit 16 captures images of the license plate 4 attached to the vehicle 2. The image capturing unit 16 uses the HOG algorithm to compute the captured images of the license plate 4 to thereby generate an eigenvalue of license plate position image sample and an eigenvalue of new license plate number image sample. For example, the eigenvalues relate to a pixel gradient and a rotational angle of the images of the license plate 4.

The values of the pixel gradient fall into two categories, namely a horizontal gradient value G_X and a vertical gradient value G_y. The relationship between the horizontal gradient value G_X, the vertical gradient value G_y, and the rotational angle is illustrated with the mathematical expression below, where G denotes the pixel gradient, and θ denotes the rotational angle.

$$G=\sqrt{(G\_x^2+G\_y^2)}$$

$$\theta=\tan^{-1}G_y/G_x$$

Figure 3:
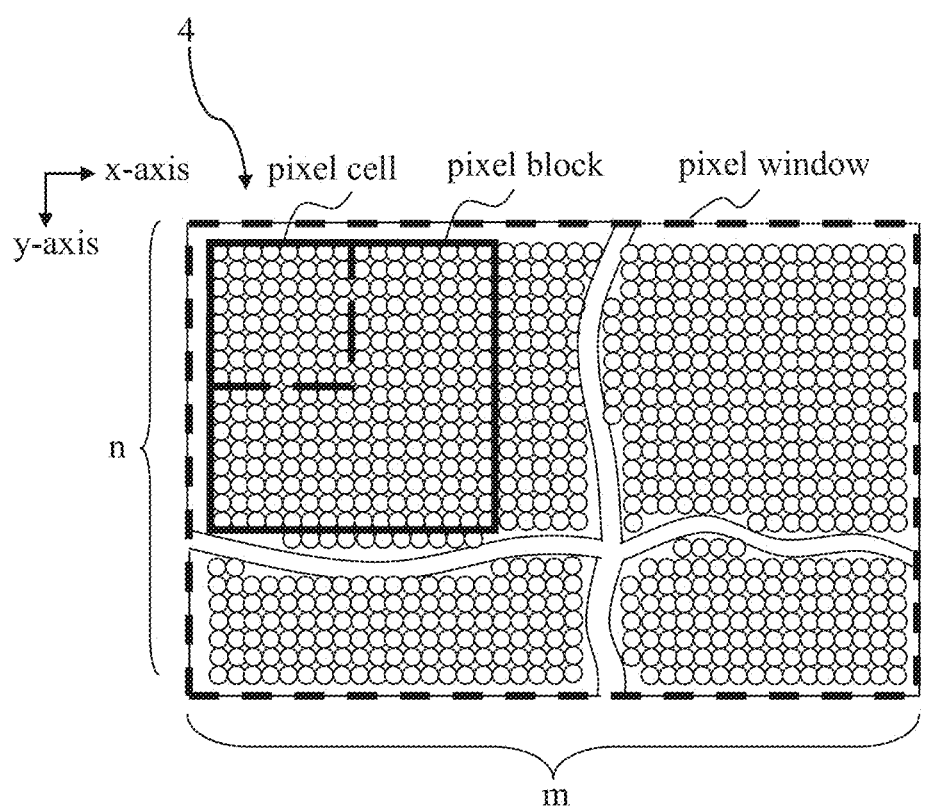
FIG. 3 is a schematic view of an image of a license plate number of FIG. 1.

Referring to FIG. 3, the number of the pixels attributed to an image of the license plate 4 and aligned along the x-axis is denoted by a positive integer m, whereas the number of the pixels attributed to the image of the license plate 4 and aligned along the y-axis is denoted by a positive integer n, such that the total number of the pixels contained in the image of the license plate 4 equals the product of the two integers m, n. In this embodiment, the total number of the pixels, and configuration thereof, in the image of the license plate 4 are exemplified and expressed by m=96 and n=24, such that the total number of pixels in the image of the license plate 4 equals 2304. In this embodiment, each instance of the process of processing the pixels in the images of the license plate 4 is performed on three different groups of contiguous pixels, namely a pixel cell, a pixel block, and a pixel window, which are distinguished from each other in terms of quantity of pixels and configuration.

For an illustrative purpose, the pixel cell is expressed by m=8 and n=8 and thus contains 64 pixels. For an illustrative purpose, the pixel block is expressed by m=16 and n=16 and thus contains 256 pixels. In this embodiment, the pixel block can be divided into four pixel cell. For an illustrative purpose, the pixel window is expressed by m=96 and n=24 and thus contains 2304 pixels. In this embodiment, the number of pixels contained in the pixel window equals the total number of pixels in the image of the license plate 4, that is, 2304.

Take the eigenvalue of the license plate position image sample as an example, given the aforesaid definitions of the pixel cell, the pixel block, and the pixel window, the image of the license plate 4 can be partitioned into 22 pixel blocks each composed of four pixel cells.

Furthermore, in each of nine instances of its rotation, each pixel block rotates by a specific angle, say, 20 degrees, to change the configuration of its pixels and thereby become a new pixel block. Hence, the number of eigenvalues of license plate position image sample is calculated as follows:

$$9 \times ((11 \times 2) \times 4) = 792$$

The aforesaid consideration and calculation applies to the number of eigenvalues of the license plate number image sample as well. The difference between the aforesaid two aspects lies in the difference between a pixel cell, a pixel block, and a pixel window in terms of quantity of pixels and configuration.

For instance, the eigenvalue of the license plate position sample type can be set to the sizes of the pixel cell, pixel block, and pixel window, provided that optimal recognition performance is achieved in the shortest period of time.

Referring to FIG. 2, with a negative image sample (which consists of any images other than the images of the license plate 4) loaded, the PCA, and the SVM, the sorting unit 18 computes the eigenvalue of the license plate position image sample to thereby create the license plate position sample type-related data LPPSTD, and computes the eigenvalue of the license plate number image sample to thereby create the license plate number sample type-related data (LPNSTD).

Figure 4:
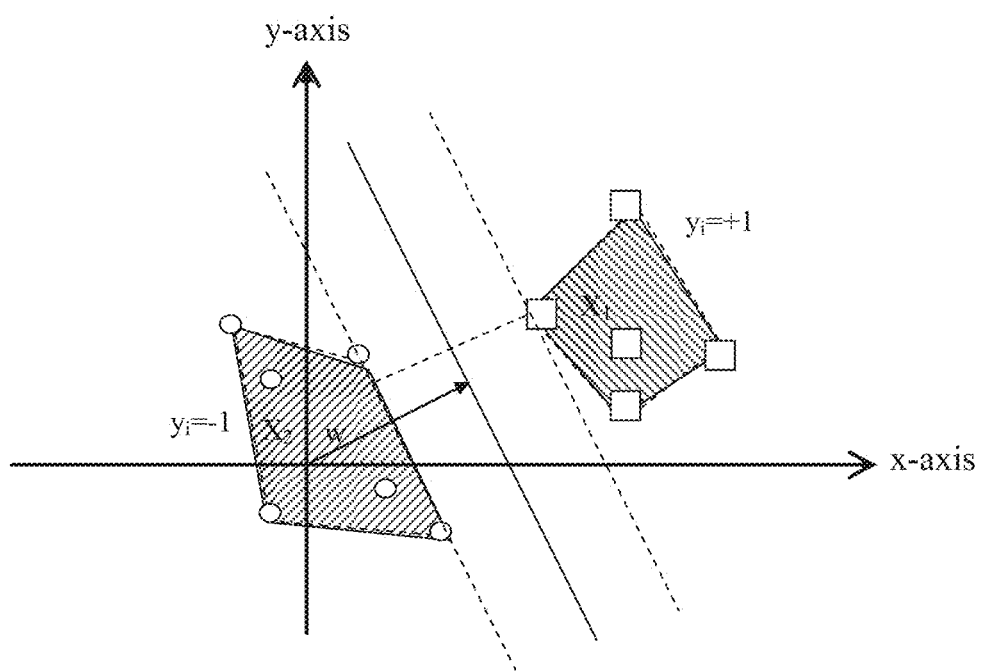
FIG. 4 is a schematic view of computation performed with support vector machine (SVM) of FIG. 1.

Referring to FIG. 4, there is shown a schematic view of computation performed with the SVM of FIG. 1.

The SVM is a classification algorithm.

As shown in FIG. 4, in the Cartesian coordinate system defined by the x-axis and the y-axis, there are two type regions, namely first type region $X_1$ (the one on the right) and second type region $X_2$ (the one on the left), each of which consists of a plurality of type data. A hyperplane (indicated by the solid line), which is defined between the first type region $X_1$ and the second type region $X_2$ to separate them from each other, is calculated by the SVM functioning as the classification algorithm.

In this regard, the purpose of the SVM is to locate the hyperplane and separate the first type region $X_1$ and the second type region $X_2$ from each other by the longest distance with the hyperplane. When applied to the present invention, the type region $X_1$ represents the license plate position database 122, and the type region $X_2$ represents the license plate number database 124.

Figure 5:
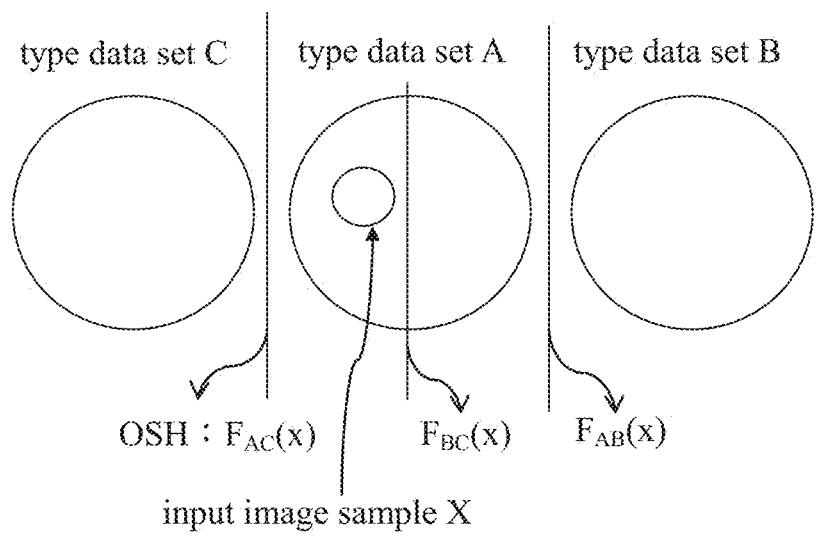
FIGS. 5-7 are schematic views of a reducing module of FIG. 1.
Figure 6:
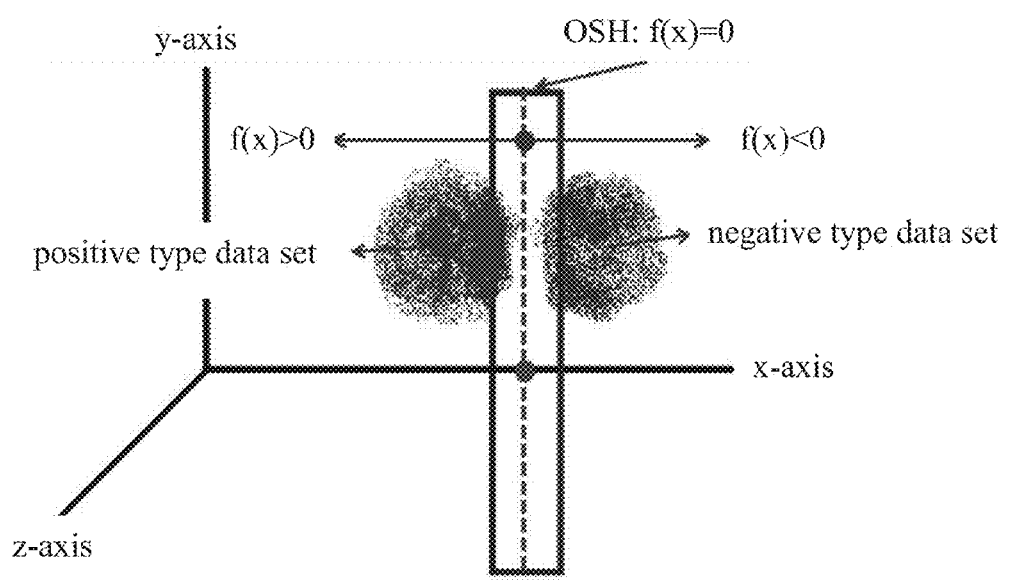
Figure 7:
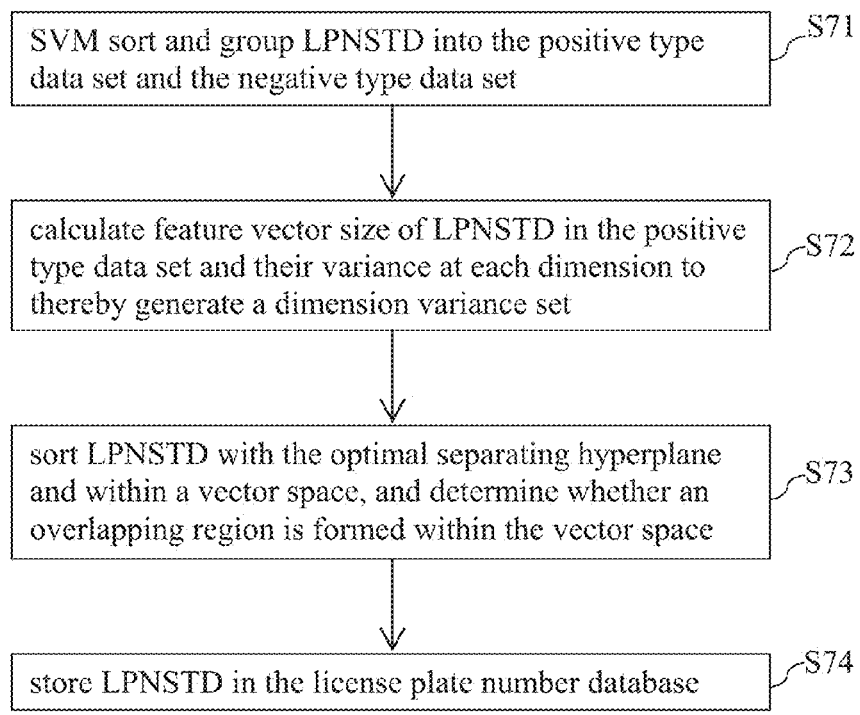

Referring to FIGS. 5-7, there are schematic views of reducing module in FIG. 1.

After the sorting unit 18 has finished computing the eigenvalue of the license plate position image sample and the eigenvalue of the license plate number image sample, the sorting unit 18 creates an enormous amount of the license plate position sample type-related data LPPSTD and the license plate number sample type-related data LPNSTD.

Hence, to prevent excessive occupation of the storage space of the database module 12, the reducing module 14 reduces the quantity of the license plate position sample type-related data LPPSTD and the quantity of the license plate number sample type-related data LPNSTD by following the steps as follows:

1) Reduction of Data in the License Plate Position Database

The SVM comprises n support vectors. Each support vector has the same dimension as the feature vector. The sorting process of the SVM involve multiplying the eigenvalue of the license plate position image sample ELLPIS by the support vectors of n dimensions, and then multiplying the product by another vector of n dimensions, to thereby create the license plate position sample type-related data LPPSTD.

As mentioned above, the eigenvalue of the license plate position image sample ELLPIS is multiplied by n support vectors and the vector of n dimensions. Hence, referring to the mathematical inference below, it is feasible to multiply n support vectors by the vector of n dimensions to obtain a one-dimension decision vector as shown in the mathematical expression $\vec{D}$. Please take note of the definitions of the symbols shown in Table 1.

TABLE 1

| fvs | feature vector size |
|---|---|
| svt | support vector total |
| $\vec{s}$ | sample feature vector |
| $S_v$ | support vector set |
| ρ | rho |
| $S_\alpha$ | alpha set |

$\vec{S}$ denotes a feature vector derived from the eigenvalue of license plate position image sample ELLPIS. The feature vector is defined as follows:

$$\vec{S} \in R^{fvs \times 1}$$

$S_v$ denotes a set composed of the support vectors of the support vector machine. The set is defined as follows:

$$S_v = \{\vec{v}_i\}, i=1\sim svt, \vec{v}_i \in R^{fvs \times 1}$$

The result of the computation performed by the support vector machine (SVM) is expressed by the equation below. The type of the eigenvalue of the license plate position image sample ELLPIS depends on the value of Sum.

$$\text{Sum} = -\rho + \sum_{i=0}^{svt} [\alpha_i(\vec{s} \square \vec{v}_i)]$$

if, Sum > 0 ⇒ class1 if, Sum < 0 ⇒ class2

Eliminate $\vec{S}^T$ from the above equation to obtain the equation below.

$$\text{Sum} = -\rho + \sum_{i=0}^{svt} [\alpha_i(\vec{s} \square \vec{v}_i)]$$

$$\Rightarrow \text{Sum} = -\rho + \vec{s} \square \sum_{i=0}^{svt} \alpha_i[\vec{v}_i]$$

$$\Rightarrow \text{Sum} = -\rho + \vec{s} \square \vec{D}$$

In the above equation, $\vec{D}$ denotes the decision vector, and the decision vector is defined as follows:

$$\vec{D} \in R^{fvs \times 1}$$

$$\vec{D} = \sum_{i=0}^{svt} \alpha_i[\vec{v}_i]$$

In this embodiment, the result of sorting is obtained by multiplying the eigenvalue of license plate position image sample ELLPIS by the decision vector $\vec{D}$ with the sorting criteria set forth as follows:

$$\text{then} \Rightarrow \begin{cases} \text{Sum} = -\rho + \vec{s} \Box \vec{D} \\ \text{if, Sum} > 0 \Rightarrow \text{class1} \\ \text{if, Sum} < 0 \Rightarrow \text{class2} \end{cases}$$

The aforesaid inference indicates that the number of dimensions of the support vector set has decreased from n to 1.

2) Reduction of Data in License Plate Number Database

Referring to FIG. 5, an input image sample X is sorted and grouped into three type data sets by means of the sorting unit 18. The three type data sets are, namely type data set A, type data set B, and type data set C. A hyperplane function $F_{AB}(x)$ is defined between the type data set A and the type data set B. A hyperplane function $F_{AC}(x)$ is defined between the type data set A and the type data set C. A hyperplane function $F_{BC}(x)$ is defined between the type data set B and the type data set C. The three aforesaid hyperplane functions correlate with the input image sample X.

Referring to FIG. 6, the input image sample X in FIG. 5 is grouped into two type data sets, namely a positive type data set and a negative type data set, by the SVM.

The support vector machine computes the optimal separating hyperplane (OSH) within a vector space defined by x-axis, y-axis, and z-axis. The OSH can be expressed by an OSH function F(x). The OSH function F(x) correlates with the input image sample X. Furthermore, the support vector machine divides the input image sample X into two types, namely the positive type data set and the negative type data set, according to the criterion f(x)>0 and the criterion f(x)<0.

Given a plurality of eigenvalues of license plate number image sample, the distance between the OSH and each eigenvalue of license plate number image sample is not necessarily constant. Hence, each eigenvalue of license plate number image sample is substituted into the OSH function F(x) to thereby generate another eigenvalue of license plate number image sample. Given the OSH function F(x), license plate number image sample eigenvalues are likely to generate new license plate number image sample eigenvalues having insignificant differences therebetween, and in consequence the new license plate number image sample eigenvalues are grouped mostly into the positive type data set and the negative type data set.

The sorting process actually involves mapping all the eigenvalue of license plate number image sample to the normal vector (i.e. the y-axis) of the OSH.

Still, the downsized input image sample space is likely to contain any overlapping region (such as an area where the first type region $X_1$ and the second type region $X_2$ overlap), and one-to-one mapping cannot occur in the overlapping region. Hence, in another embodiment, sorting can be carried out, using an input image sample space of a larger number of dimensions.

Referring to FIG. 1, the license plate number database 124 sorts and groups the plurality of license plate number sample type-related data LPNSTD into the positive type data set and the negative type data set, and determines whether the license plate number sample type-related data LPNSTD can be fully sorted and grouped into a one-dimensional axis. If it is determined that the license plate number sample type-related data LPNSTD cannot be fully sorted and grouped into a one-dimensional axis, it will be necessary to add one more dimension so as to enable the one-to-one mapping of the license plate number sample type-related data LPNSTD onto the input image sample space and thereby reduce the quantity of the license plate number sample type-related data LPNSTD.

Referring to FIG. 7, there is shown a flow chart of the process flow of reducing related data stored in the license plate number database.

In step S71, the SVM sorts and groups a plurality of license plate number sample type-related data LPNSTD into the positive type data set and the negative type data set.

In step S72, the feature vector size of the license plate number sample type-related data LPNSTD in the positive type data set and their variance at each dimension are calculated to thereby generate a dimension variance set. The dimension variance set is expressed by the equation below. Please make reference to the definitions of the mathematical notations shown in Table 2.

TABLE 2

| | |
|---|---|
| fvs | feature vector size |
| st | sample total |
| $\vec{s}$ | sample feature vector |
| V | dimension variance set |
| Q | set of quantizing steps |
| qt | number of quantizing steps |

The definition of the dimension variance set is as follows:

$$\bar{S} \in R^{fvs \times 1}$$

V denotes the variance set at each dimension, and the variance set is defined as follows:

$$V = \{v_i\}, i = 1 \sim fvs, v_i \in R^1$$

Q denotes a set of gradient quantizing steps, and the set of gradient quantizing steps is defined as follows:

$$Q = \{q_i\}, i = 1 \sim qt, q_i \in R^1$$

$f_{q_i}$ denotes the number of quantizing steps $q_i$, and N denotes the total of all the quantizing steps. Their relationship is expressed by the equation below.

$$N = \sum_{i=0}^{qt} f_{qi}$$

$P_{q_i}$ denotes the probability of quantizing steps $q_i$, and the probability equals 1, wherein its equation is as follows:

$$P_{qi} = f_{qi}/N, \ P_{qi} \geq 0$$

$$\sum_{i=0}^{qt} P_{qi} = 1$$

The equation of dimension average μ is as follows:

$$\mu = E[q_i] = \sum_{i=0}^{qt} q_i P_{qi}$$

Given the dimension average μ, the equation of the variance set V is as follows:

$$v = E[(q_i - \mu)^2] = \sum_{i=0}^{qt} (q_i - \mu)^2 P_{q_i}$$

With the above equations, it is feasible to calculate dimension variance set V.

In step S73, sorting is carried out to the license plate number sample type-related data LPNSTD with the OSH and within the vector space. Step S73 further involves determining whether the vector space has an overlapping region therein. If the license plate number sample type-related data LPNSTD form an overlapping region within the input image sample space, it will be necessary to choose the largest dimension from the variance set and perform sorting once again until there is no overlapping region.

In step S74, the reduced license plate number sample type-related data LPNSTD are stored in the license plate number database 124.

Figure 8:
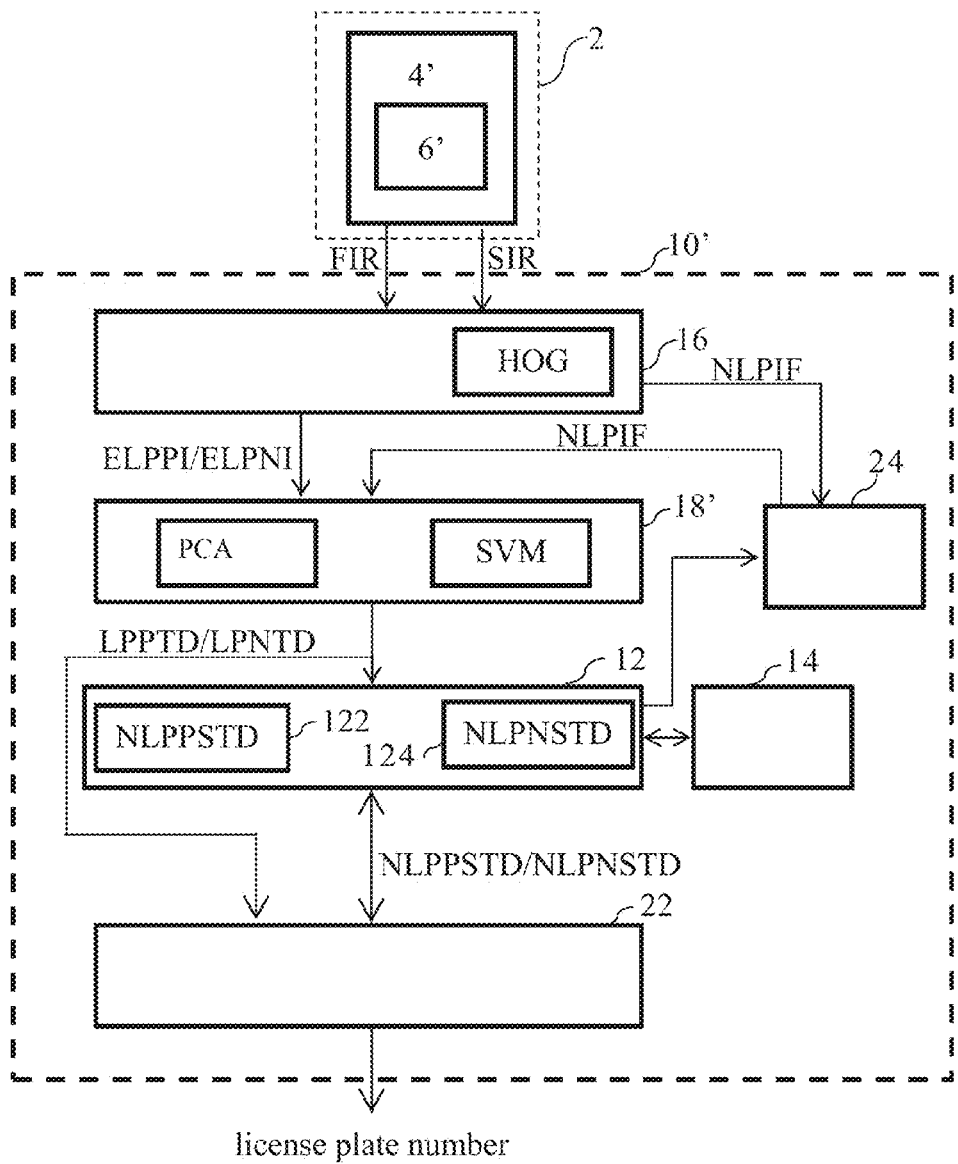
FIG. 8 is a block diagram of a license plate recognition system according to the second embodiment of the present invention.

Referring to FIG. 8, there is shown a block diagram of a license plate recognition system according to the second embodiment of the present invention. As shown in FIG. 8, a license plate recognition system 10' not only has the related components disclosed in the first embodiment, namely the database module 12, the reducing module 14, the image capturing unit 16 and the recognizing module 22, but also comprises an updating module 24 and a sorting unit 18'.

The updating module 24 is connected to the database module 12 and the image capturing unit 16. The updating module 24 receives from the image capturing unit 16 images of a plurality of the new license plate 4' (whose license plate position sample type-related data LPPSTD are absent from the database module 12), and generate a plurality of new license plate image frames NLPIF, wherein the new license plate 4' bears a new license plate number 6'.

The sorting unit 18' is connected to the image capturing unit 16 and the database module 12. The sorting unit 18' uses the PCA and the SVM to compute images of one of the new license plate image frames NLPIF to thereby create new license plate position sample type-related data NLPPSTD and new license plate number sample type-related data NLPNSTD. The sorting unit 18' stores the new license plate position sample type-related data NLPPSTD in the license plate position database 122 and stores the new license plate number sample type-related data NLPNSTD in the license plate number database 124.

Hence, the license plate recognition system 10' recognizes the new license plate 4' by means of the new license plate position sample type-related data NLPPSTD and the new license plate number sample type-related data NLPNSTD which are stored in the database module 12.

Figure 9:
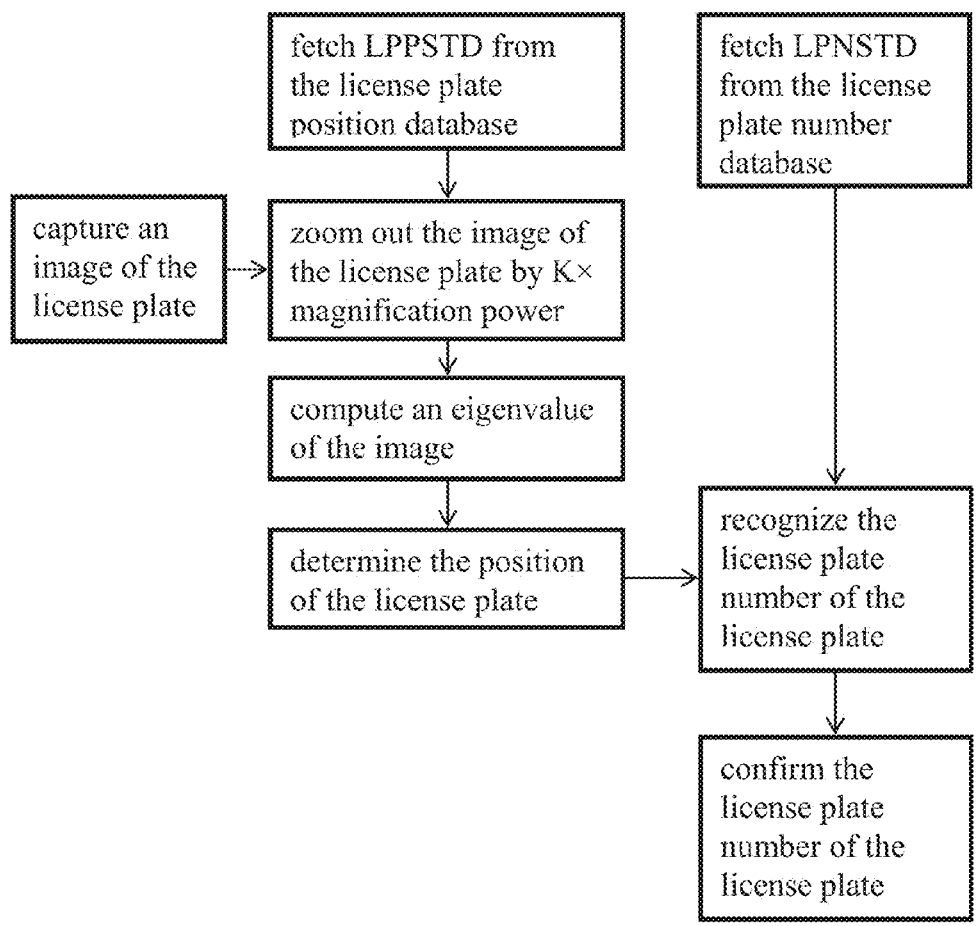
FIG. 9 is a flow chart of the process of capturing and recognizing the license plate image shown in FIG. 1.

Referring to FIG. 9, there is shown a flow chart of the process flow of capturing and recognizing the license plate image of FIG. 1. As shown in FIG. 9, the license plate image is captured and recognized in two stages.

In the first stage, an image of the license plate 4 is captured at the first imaging resolution (a relatively low imaging resolution) to thereby generate the first license plate image. Then, the recognizing module 22 determines the position of the license plate 4 at the vehicle 2 by means of the first license plate image.

For instance, the process of capturing the image of the license plate 4 at the first imaging resolution involves using the image capturing unit 16 (such as camcorder) to capture the image of the license plate 4 and then zoom out the image of the license plate 4 by K× magnification power (i.e., K power). Afterward, the image of the license plate 4 is fully scanned with the first license plate image reduced by K× magnification power while the K value is gradually changed, such that the size of the first license plate image eventually equals that of the image of the license plate. Due to the aforesaid scan, the position of the license plate 4 can be determined after the first license plate image and the image of the license plate have overlapped completely.

In the second stage, an image of the license plate 4 is captured at the second imaging resolution (a relatively high imaging resolution) to thereby generate the second license plate image. The recognizing module 22 recognizes the license plate number 6 of the license plate 4 by means of the second license plate image.

For instance, the process of capturing the image of the license plate 4 at the second imaging resolution takes place after the first stage and involves: determining by the recognizing module 22 as to whether the license plate number database 124 contains the license plate number sample type-related data LPNSTD pertaining to the license plate number 6; recognizing the license plate number 6 by the recognizing module 22 by means of the license plate number sample type-related data LPNSTD when the determination is affirmative; and recognizing, upon a negative determination and by the recognizing module 22, that the license plate 4 is a new license plate.

Referring to FIGS. 10-14, there are shown flow charts of the operation of the updating module of FIG. 8.

Figure 10:
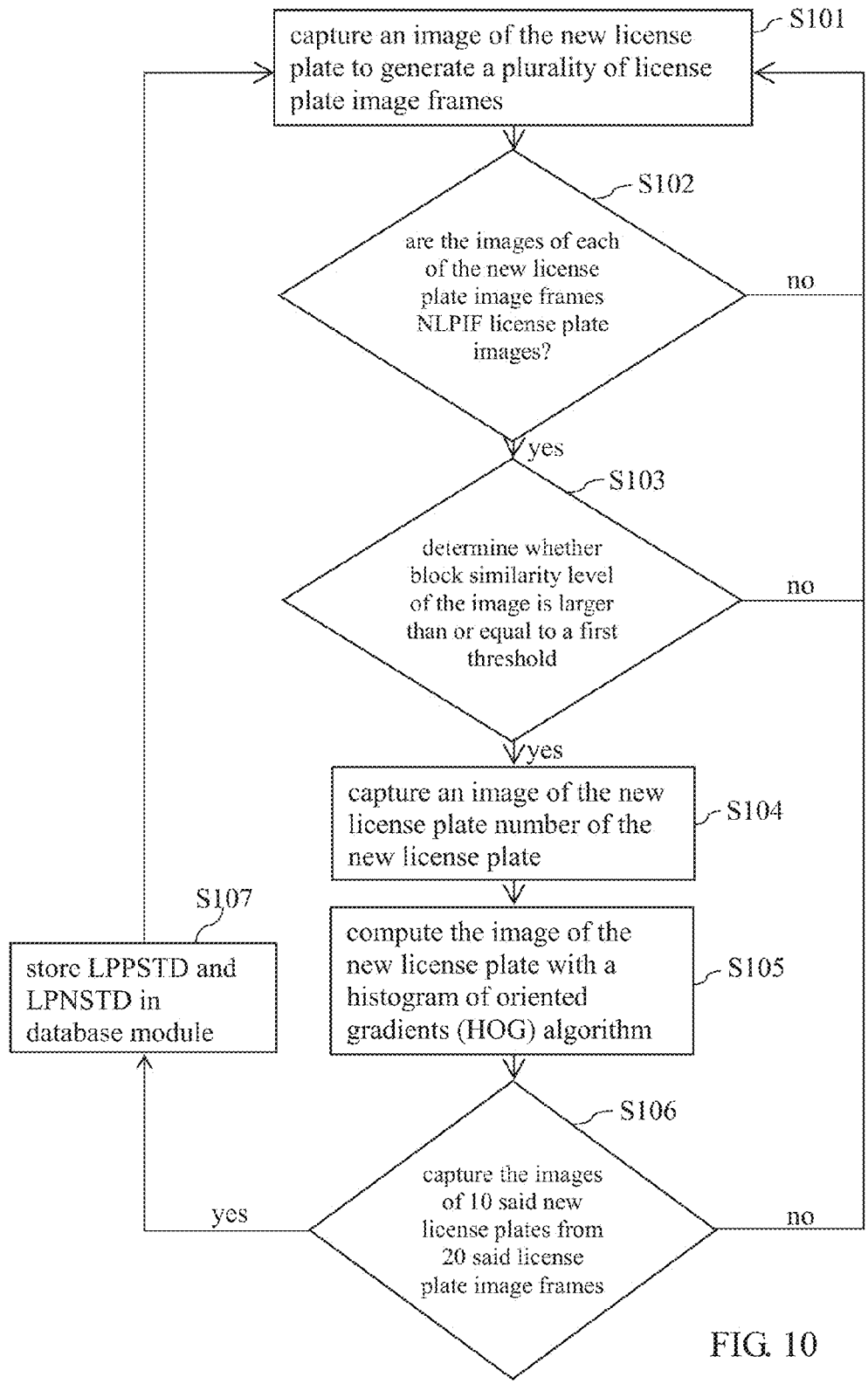
FIGS. 10-14 are flow charts of the process flow of operation of an updating module of FIG. 8.
Figure 11:
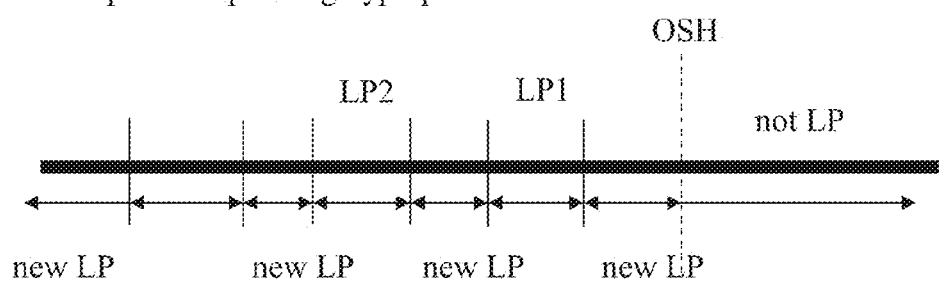

Referring to FIG. 10, the updating module 24 stores in the database module 12 the new license plate position sample type-related data NLPPSTD and the new license plate number sample type-related data NLPNSTD pertaining to the new license plate 4'.

The aforesaid updating step starts with step S101 in which the image capturing unit 16 captures images of the new license plate 4' consecutively to thereby generate a plurality of new license plate image frames NLPIF.

In step S102, determine whether the images of each of the new license plate image frames NLPIF are license plate images. The recognizing module 22 uses a license plate region diagram shown in FIG. 11 to determine the image of the new license plate 4'. If the recognizing module 22 determines that the new license plate 4' falls into the new license plate region (denoted by "new LP"), it will mean that the new license plate 4' is to be determined to be a new license plate.

In step 103, determine whether the image of the new license plate 4' exhibits a block similarity level higher than a first threshold. The block similarity level is defined as a feature of pattern uniform distribution in a specific image. In this embodiment, given the feature of the pattern uniform distribution, it is feasible to determine whether the image is attributed to the new license plate 4'.

If the block similarity level of the image of the new license plate 4' is less than the first threshold, the process flow will go back to step S101 to wait for the image of the new license plate 4' again. If the block similarity level is higher than or equal to the first threshold, the process flow will go to step S104 to determine whether the image of the new license plate 4' is the license plate image.

Hence, in order to determine whether the image of the new license plate 4' is the license plate image, it is necessary to determine whether the block similarity level of the image of the new license plate 4' is larger than the first threshold. To this end, the first threshold has to be calculated.

To calculate the first threshold, it is necessary to partition the image of the new license plate 4' into a plurality of image blocks, and then calculate the mathematical relationship between the images blocks in terms of parameters, such as the largest number $I_{max}$, the least number $I_{min}$, difference $I_{diff}$, variance μ, and variance v, to thereby determine the first threshold.

The image blocks each consist of a plurality of pixels, and each pixel emits colored light with a single wavelength. In this embodiment, the image blocks each consist of the same amount of pixels.

The relationship between the first threshold, the largest number $I_{max}$, the least number $I_{min}$, difference $I_{diff}$, mean $\mu_{diff}$, and variance $v_{diff}$ is defined by the mathematical expression below.

$$\begin{cases} I_{max,b_i} = \underset{pix_i \in b_i}{\operatorname{argmax}} I_{pix_i}, & i = 1 \sim 3 \\ I_{min,b_i} = \underset{pix_i \in b_i}{\operatorname{argmin}} I_{pix_i}, & i = 1 \sim 3 \end{cases}$$

$$\mu_{diff} = \frac{1}{3} \sum_{i=1}^{3} I_{diff,b_i}$$

$$v_{diff} = \frac{1}{3} \sum_{i=1}^{3} |I_{diff,b_i} - \mu_{diff}|^2$$

Not all of the pixels within each of the image blocks emit visible light at a specific wavelength, say 700 nm (i.e., that of red light), simultaneously. The image blocks do not necessarily have the same number of pixels emitting visible light at the specific wavelength 700 nm at a specific point in time. Among the images blocks, the one which has the largest number of pixels emitting visible light at the specific wavelength 700 nm is selected. The largest number $I_{max}$ is defined as the number of the 700 nm-related pixels of the selected image block. Likewise, the least number $I_{min}$ is defined as the number of the 700 nm-related pixels within the image blocks having the least number of the 700 nm-related pixels. The difference $I_{diff}$ is calculated by subtracting the least number $I_{min}$ from the largest number $I_{max}$. The variance μ is calculated by dividing the difference $I_{diff}$ by a value cutmum. For example, the value cutmum is set to 1. The variance v is calculated by subtracting the variance μ from the difference $I_{diff}$ to obtain the difference, squaring the difference to obtain the product, and eventually dividing the product by the value cutmum to obtain the quotient. The quotient is the variance v.

The relationship between $v_{diff}$ and the first threshold l is defined with the mathematical expression below.

$$v_{diff} < l$$

Hence, the first threshold l can be determined by making reference to the variance v.

Figure 12:
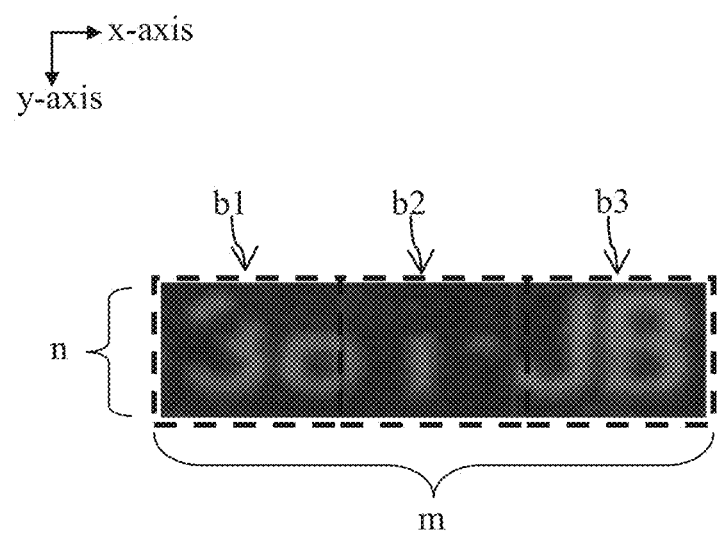

Referring to FIG. 12, for example, the image of the new license plate 4' is defined as one having m pixels along the x-axis and n pixels along the y-axis according to the definition given to the image of the license plate 4 and illustrated with FIG. 3. For instance, image of the new license plate 4' is defined with m=96 and n=24 for illustrative purposes.

The image of the new license plate 4' is evenly partitioned into three image blocks b1, b2, b3, such that each of the image blocks b1, b2, b3 has 32 pixels along the x-axis and 24 pixels along the y-axis.

Referring to FIG. 10, in step S104, the image of the new license plate number 6' of the new license plate 4' is captured. The image of the new license plate number 6' can be accurately demarcated by means of a blank region at the image boundary between the new license plate number 6' and the license plate 4'.

For instance, the size of the image of the new license plate number 6' is selected. The image size matches an image range. Change the image range gradually until the image of the new license plate number 6' overlaps the image of the new license plate 4'. During the process of changing the image range, a statistical analysis is performed on the grayscale value variance of the column pixels and the row pixels of the image. Upon determination that the grayscale value variance is less than a specific threshold, the range of the image is defined as the image boundary of the new license plate number 6'. The grayscale value variance is calculated with the equation below.

$$N = f_1 + f_2 + \ldots + f_L$$

where f denotes grayscale value quantity, L denotes the largest grayscale value, and N denotes the total number of grayscale values.

If $P_i$ denotes the probability of a grayscale value i, and the total of the probability of the grayscale values equals 1, then $P_i$ is calculated by the equation as follows:

$$P_i = f_i / N, \quad P_i \geq 0$$

$$\sum_{i=0}^{L} P_i = 1$$

The relationship between grayscale value average μ and the probability $P_i$ is expressed by the equation below.

$$\mu = E[i] = \sum_{i=0}^{L} i P_i$$

The relationship between grayscale value variance v and the grayscale value average μ is expressed by the equation below.

$$v = E[(i-\mu)^2] = \sum_{i=0}^{L} (i-\mu)^2 P_i$$

With the above equations, it is feasible to calculate the grayscale value variance of the column pixels and row pixels of the new license plate number image 6' within the image range, and confirm the distribution of the column pixels and row pixels of the new license plate number image 6' by making reference to the grayscale value variance.

In step S105, uses the HOG algorithm to compute an image of the new license plate 4'.

In step S106, determine an image attributed to 10 said new license plates 4' and captured by the image capturing unit 16 from 20 said new license plate image frames NLPIF. If the determination is affirmative, the process flow will go to step S107 to store in the database module 12 the new license plate position sample type-related data NLPPSTD and the new license plate number sample type-related data NLPNSTD. If the determination is negative, the process flow will go back to step S101 to allow the image capturing unit 16 to capture an image of the new license plate 4' and thereby generate the new license plate image frames NLPIF.

Figure 13:
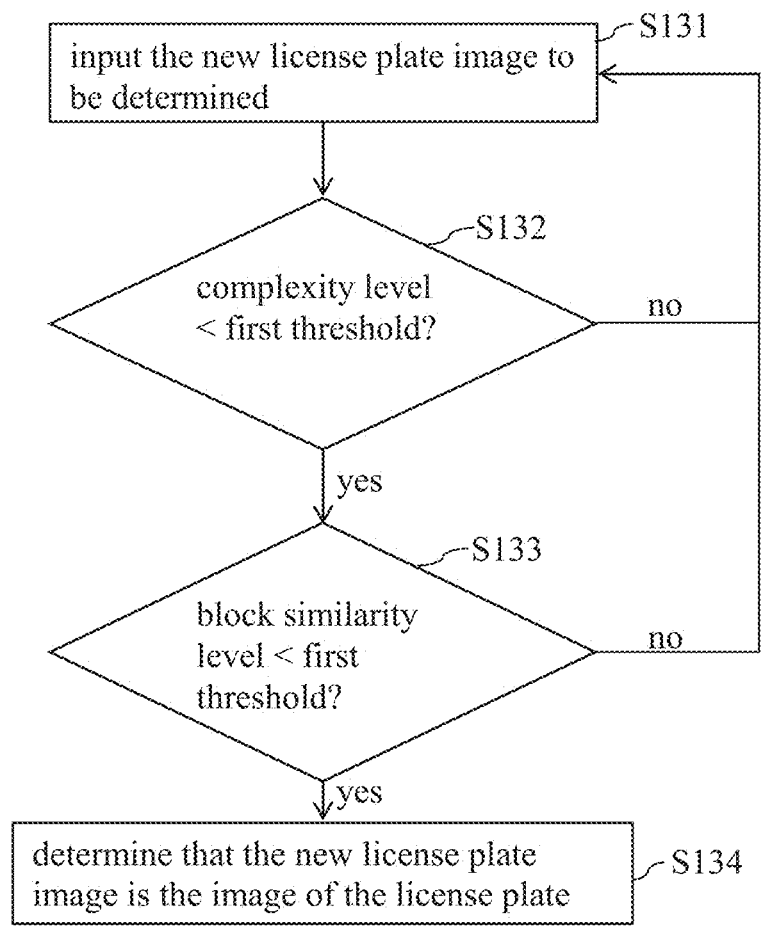

Referring to FIG. 13, there is a flow chart of step S102 of FIG. 10.

In step S131, capture an image of the new license plate 4', wherein the captured image awaits determination thereof.

In step S132, determine whether the complexity level of a marginal image of the new license plate is less than the first threshold. If it is determined that the complexity is larger than the first threshold, the process flow will go back to step S131. If the complexity is less than the first threshold, the process flow will go to step S133. The complexity is defined as the total of the pixels of the marginal image.

In step S133, determine whether the block similarity level of the new license plate images is lower than the first threshold. If the block similarity level is higher than the first threshold, the process flow will go back to step S131. If the block similarity level is lower than the first threshold, the process flow will go to step S134.

Hence, if both the complexity and the block similarity level are less than the first threshold, it can be confirmed that the new license plate images are license plate images.

Figure 14:
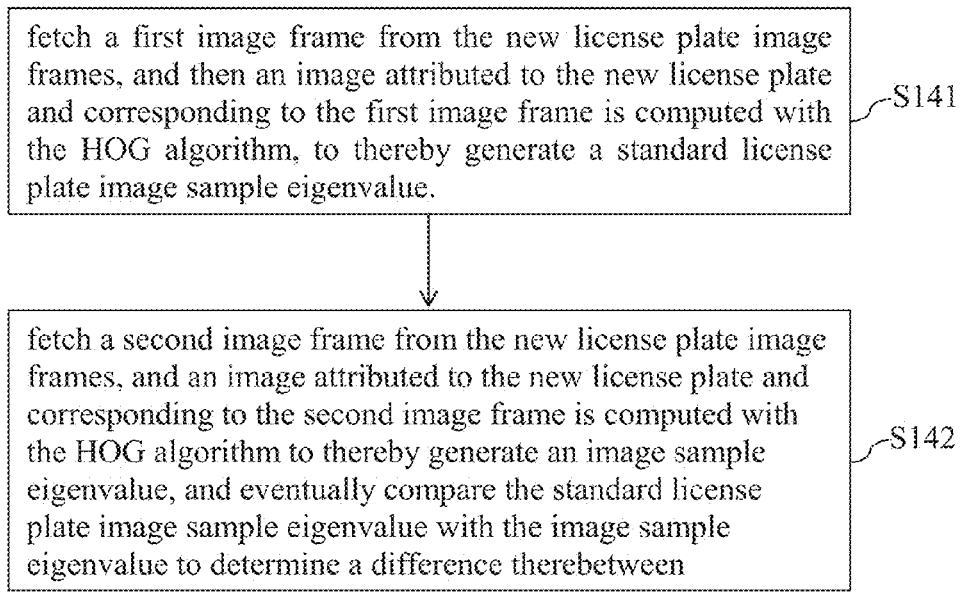

Referring to FIG. 14, there is a flow chart of step S107 of FIG. 10.

In step S141, a first image frame is fetched from the new license plate image frames NLPIF, and then an image attributed to the new license plate 4' and corresponding to the first image frame is computed with the HOG algorithm, to thereby generate a standard license plate image sample eigenvalue. The standard license plate image sample eigenvalue correlates with the new license plate position sample type-related data NLPPSTD and the new license plate number sample type-related data NLPNSTD.

In step S142, the second image frame is fetched from the new license plate image frames NLPIF, and an image attributed to the new license plate 4' and corresponding to the second image frame is computed with the HOG algorithm to thereby generate an image sample eigenvalue, and eventually the standard license plate image sample eigenvalue is compared with the image sample eigenvalue to determine a difference therebetween.

If the difference between the first image frame and the second image frame is less than the second threshold, the standard license plate image sample eigenvalue will be replaced with the image sample eigenvalue. If the difference between the first image frame and the second image frame is larger than or equal to the second threshold, the standard license plate image sample eigenvalue will remain unchanged.

After comparing the first image frame with the second image frame, step S142 further involves storing in the license plate position database 122 the new license plate position sample type-related data NLPPSTD corresponding to the standard license plate image sample eigenvalue and storing in the license plate number database 124 the new license plate number sample type-related data NLPNSTD corresponding to the standard license plate image sample eigenvalue.

The aforesaid difference is expressed as follows:

$$\bar{S}_{std} \in R^{fvs \times 1}, \quad \bar{S} \in R^{fvs \times 1}$$

where $\bar{S}_{std}$ denotes the standard license plate image sample eigenvalue, and $\bar{S}$ denotes the image sample eigenvalue.

The difference m is calculated by comparing the standard license plate image sample eigenvalue with the image sample eigenvalue. If the difference m is less than the second threshold l, the standard license plate image sample eigenvalue will be replaced with the image sample eigenvalue. The equation of the difference m, and the mathematical expression of the relationship between the difference m and the second threshold l are shown below. In the equation, i denotes the new license plate image frames NLPIF.

$$m = \sqrt{\sum_{i=0}^{fvs} (S[i] - S_{std}[i])^2}, \, m < l$$

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A license plate recognition system for use in recognizing a license plate attached to a vehicle, the license plate bearing a license plate number, the license plate recognition system comprising:

a database module comprising a license plate position database and a license plate number database, the license plate position database storing a plurality of license plate position sample type-related data, and the license plate number database storing a plurality of license plate number sample type-related data;

a reducing module connected to the database module and adapted to reduce quantity of the license plate position sample type-related data and quantity of the license plate number sample type-related data in the database module;

an image capturing unit for capturing a license plate image at a first imaging resolution to compute the license plate image with a histogram of oriented gradients (HOG) algorithm and thereby generate an eigenvalue of license plate position image, and capturing a license plate image at a second imaging resolution to compute the license plate image with the HOG algorithm and thereby generate an eigenvalue of license plate number image, wherein the second imaging resolution is of a level higher than that of the first imaging resolution;

a sorting unit connected to the image capturing unit to compute an eigenvalue of the license plate position image with principal component analysis (PCA) and support vector machine (SVM) and thereby create license plate position type-related data, and compute an eigenvalue of the license plate number image with the PCA and the SVM and thereby create license plate number type-related data; and a recognizing module connected to the sorting unit and the database module to compare the license plate position type-related data with the license plate position sample type-related data, compare the license plate number type-related data with the license plate number sample type-related data after determining that the license plate position type-related data is identical with one of the license plate position sample type-related data, and recognize the license plate number of the license plate by the license plate number sample type-related data identical with the license plate number type-related data after determining that the license plate number type-related data is identical with one of the license plate number sample type-related data.

2. The license plate recognition system of claim 1, further comprising an updating module connected to the database module and the image capturing unit, the updating module receiving a plurality of new license plate images from the image capturing unit and generating a plurality of new license plate image frames.

3. The license plate recognition system of claim 2, wherein the sorting unit is connected to the database module and uses the PCA and the SVM to compute an image of one of the new license plate image frames to thereby create new license plate position sample type-related data and new license plate number sample type-related data.

4. A license plate recognition method for use in recognizing a license plate attached to a vehicle, the license plate bearing a license plate number, the license plate recognition method comprising the steps of:
 (a) storing a plurality of license plate position sample type-related data in a license plate position database and storing a plurality of license plate number sample type-related data in a license plate number database;
 (b) capturing an image of the license plate at a first imaging resolution to thereby generate a first license plate image, and capturing an image of the license plate at a second imaging resolution to thereby generate a second license plate image;
 (c) computing the first license plate image with a histogram of oriented gradients (HOG) algorithm to thereby generate an eigenvalue of license plate position image, and computing the second license plate image with the HOG algorithm to thereby generate an eigenvalue of license plate number image;
 (d) computing the eigenvalue of the license plate position image and the eigenvalue of the license plate number image with principal component analysis (PCA) and support vector machine (SVM) to thereby create license plate position type-related data and license plate number type-related data; and
 (e) comparing the license plate position type-related data with the license plate position sample type-related data, comparing the license plate number type-related data with the license plate number sample type-related data upon determination that the license plate position type-related data is identical with one of the license plate position sample type-related data, and recognizing the license plate number of the license plate by means of the license plate number sample type-related data identical with the license plate number type-related data upon determination that the license plate number type-related data is identical with one of the license plate number sample type-related data.

5. The license plate recognition method of claim 4, wherein step (a) is followed by step (f) of reducing quantity of the license plate position sample type-related data of the license plate position database and quantity of the license plate number sample type-related data of the license plate number database.

6. The license plate recognition method of claim 4, wherein step (b) further comprises the sub-step of, after failing to capture an image of the license plate at the first imaging resolution at a point of the vehicle, scanning continuously at the first imaging resolution at another point of the vehicle for an image of the license plate until an image of the license plate is captured from the vehicle.

7. The license plate recognition method of claim 6, wherein step (b) is followed by the steps of:
 (g) calculating a total of marginal pixels of the first license plate image; and
 (h) dividing the first license plate image into a plurality of image blocks, so as to determine a block similarity level between the image blocks,
 wherein, upon determination that both the total of the pixels and the block similarity level are less than a first threshold, a position of the license plate at the vehicle is determined, using the first license plate image.

8. The license plate recognition method of claim 4, wherein the step (e) further comprises the sub-step of recognizing the license plate number of the license plate as a new license plate upon determination that the license plate position type-related data is not identical with any one of the license plate position sample type-related data.

9. The license plate recognition method of claim 8, wherein step (e) is followed by the steps of:
 (i) capturing the new license plate images consecutively to thereby obtain a plurality of new license plate image frames; and
 (j) computing the new license plate image frames to thereby create and store in the license plate position database new license plate position sample type-related data pertaining to the new license plate and to thereby create and store in the license plate number database new license plate number sample type-related data pertaining to the new license plate.

10. The license plate recognition method of claim 9, wherein the step (j) further comprises the sub-step of computing the new license plate image frames with the HOG algorithm, the PCA, and the SVM.

11. The license plate recognition method of claim 10, wherein the step (j) further comprises the sub-steps of:
 (k) fetching a first image frame from the new license plate image frames and computing the new license plate image corresponding to the first image frame with the HOG algorithm to thereby generate a standard license plate image sample eigenvalue, wherein the standard license plate image sample eigenvalue correlates with the new license plate position sample type-related data and the new license plate number sample type-related data; and
 (l) fetching a second image frame from the new license plate image frames, computing the new license plate image corresponding to the second image frame with the HOG algorithm to thereby generate an image sample eigenvalue, comparing the standard license plate image sample eigenvalue with the image sample eigenvalue to calculate a difference therebetween, replacing the standard license plate image sample eigenvalue with the image sample eigenvalue if the difference is less than the second threshold, keeping the standard license plate image sample eigenvalue unchanged if the difference is not less than the second threshold, storing the new license plate position sample type-related data in the license plate position database, and storing the new license plate number sample type-related data in the license plate number database.

12. The license plate recognition method of claim 9, wherein the new license plate image frames are in the number of 10 or more.

* * * * *